United States Patent [19]

Hintz

[11] 4,330,725

[45] May 18, 1982

[54] NUTATING MOTOR COUPLING

[75] Inventor: Carmen R. Hintz, Fox Chapel, Pa.

[73] Assignee: Morgan Actuators, Inc., Seattle, Wash.

[21] Appl. No.: 128,652

[22] Filed: Mar. 10, 1980

[51] Int. Cl.³ .................................................. H02K 1/34
[52] U.S. Cl. ........................................... 310/82; 74/60
[58] Field of Search ............... 310/82, 83, 84; 74/640, 74/60; 403/359, 355, 356, 365

[56] References Cited

U.S. PATENT DOCUMENTS

Re. 29,411  9/1977  Newell ............................. 310/49 R

FOREIGN PATENT DOCUMENTS 1394532  2/1965  France ................................. 403/359

Primary Examiner—J. D. Miller
Assistant Examiner—D. L. Rebsch
Attorney, Agent, or Firm—Seed, Berry, Vernon & Baynham

[57] ABSTRACT

A constant velocity coupling joint provides rotary motion to an output shaft of a nutating motor or shaft driven by a nutating member. A nutating plate is supported by the coupling and the nutating motion of the plate is transformed to rotary motion of the output shaft. The coupling includes a plurality of balls which are mounted in slots formed between a radially extending coupling plate fixed to the shaft and the nutating rotor member. The balls are held in position by a pair of thrust spacers positioned on each side of the coupling plate. The thrust spacers also provide rolling support for the nutating plate.

6 Claims, 3 Drawing Figures

NUTATING MOTOR COUPLING

BACKGROUND OF THE INVENTION

1. Field of the Invention

This invention relates to constant velocity coupling for translating the rotary motion of a nutating motor rotor to an output shaft.

2. Background of the Invention

A nutating motor is one which employs a wobbling, or nutating, rotor element. The rotor element is caused to wobble by sequentially energizing appropriate stator windings in the motor. A pair of ring gears having oppositely spaced gear teeth are provided on the wobbling rotor element and on the stator housing. The rotor is made of magnetically permeable material so that the rotating magnetic fields produced by the stator windings cause successive adjacent sectors of the rotor to be pulled toward the successively energized adjacent stator windings and the rotor moves with a wobbling motion about a motor shaft. The rotor element is oftentimes a disc which has an axis extending nomally to its face. As the rotor nutates or wobbles, the axis of the rotor describes a conical figure around the axis of the motor output shaft. Relative rotation occurs between the two engaging ring gears on a rotor and on a stator if the engaging ring gears have a different number of teeth. For each nutational cycle of the rotor, the rotor will rotate with respect to the stator an angular distance determined by the difference between the number of gear teeth.

Various means for coupling a wobbling or nutating rotor element to an output shaft and for supporting the rotor element are known in the prior art. It is desirable that any coupling or universal joint used with a nutating motor be a constant angular velocity type. U.S. Pat. No. 3,428,839 discloses a double-yoke universal joint. U.S. Pat. No. 3,492,515 discloses a modified ball and socket coupling in which the ball is fixed to the output shaft and the nutating rotor element is coupled to a socket which is generally aligned in the direction of the shaft. U.S. Pat. No. 3,530,322 discloses a ball fixed to an output shaft and rotor having a centrally located socket for engaging the ball. These couplings are subject to friction and wear.

Prior art universal couplings for nutating motors also include ball couplings having a plurality of balls spaced equidistantly around the axis of the output shaft. The balls are held in position by means of a retainer ring having holes therein for holding the balls. An outer ball guide includes arcuate ball guide surfaces. A correspondingly matched inner ball guide includes correspondingly matched arcuate slots. This type of coupling member requires precision machining of the arcuate surfaces in addition to requiring a separate ball retaining ring.

SUMMARY OF THE INVENTION

It is an object of this invention to provide a relatively inexpensive, low friction constant velocity coupling member for coupling the nutating motion of a nutating motor to a rotating output shaft.

It is another object of the invention to provide a coupling from the rotor of a nutating motor to an output shaft which is simple in design and reliable in operation.

In accordance with these and other objects of the invention, apparatus coupling a nutating motor member, or rotor, to an output shaft is provided. This is accomplished with a structure which utilizes a plurality of balls as coupling elements. The rotary component of the movement of the wobbling rotor is coupled through the balls to the output shaft. The balls are retained in position between the rotor and the shaft by means of a plurality of axially extending semi-circular slots formed between the rotor and the output shaft. A ball guiding and retaining member coupled to the shaft has a plurality of elongated semi-circular slots formed around the outer edge thereof. The slots extend in a direction substantially parallel to the axis of the shaft. Similarly, semi-circular slots formed in the rotating rotor member extend in a direction substantially parallel to the axis of the rotor. This allows the axis of the nutating plate to describe a cone as it wobbles about the output shaft axis. The elongated slots permit movement of the balls in the axial direction of the shaft so that the rotor can tilt with respect to the output shaft axis.

The coupling also includes a pair of thrust spacers mounted on the shaft adjacent to the ball retaining member. The thrust spacer has a surface for rolling engagement with the nutating rotor member, which surface provides support for the rotor and also holding the coupling balls in their respective slots.

A method for coupling a nutating rotor member to a shaft is disclosed which includes forming a plurality of correspondingly aligned semi-circular slots in a nutating rotor member and in the shaft. Balls are inserted in the slots and thrust support spacers are positioned at the ends of the slots to retain the balls in the slots and to provide support for the rotor.

DETAILED DESCRIPTION OF THE PREFERRED EMBODIMENTS

Figure 1:
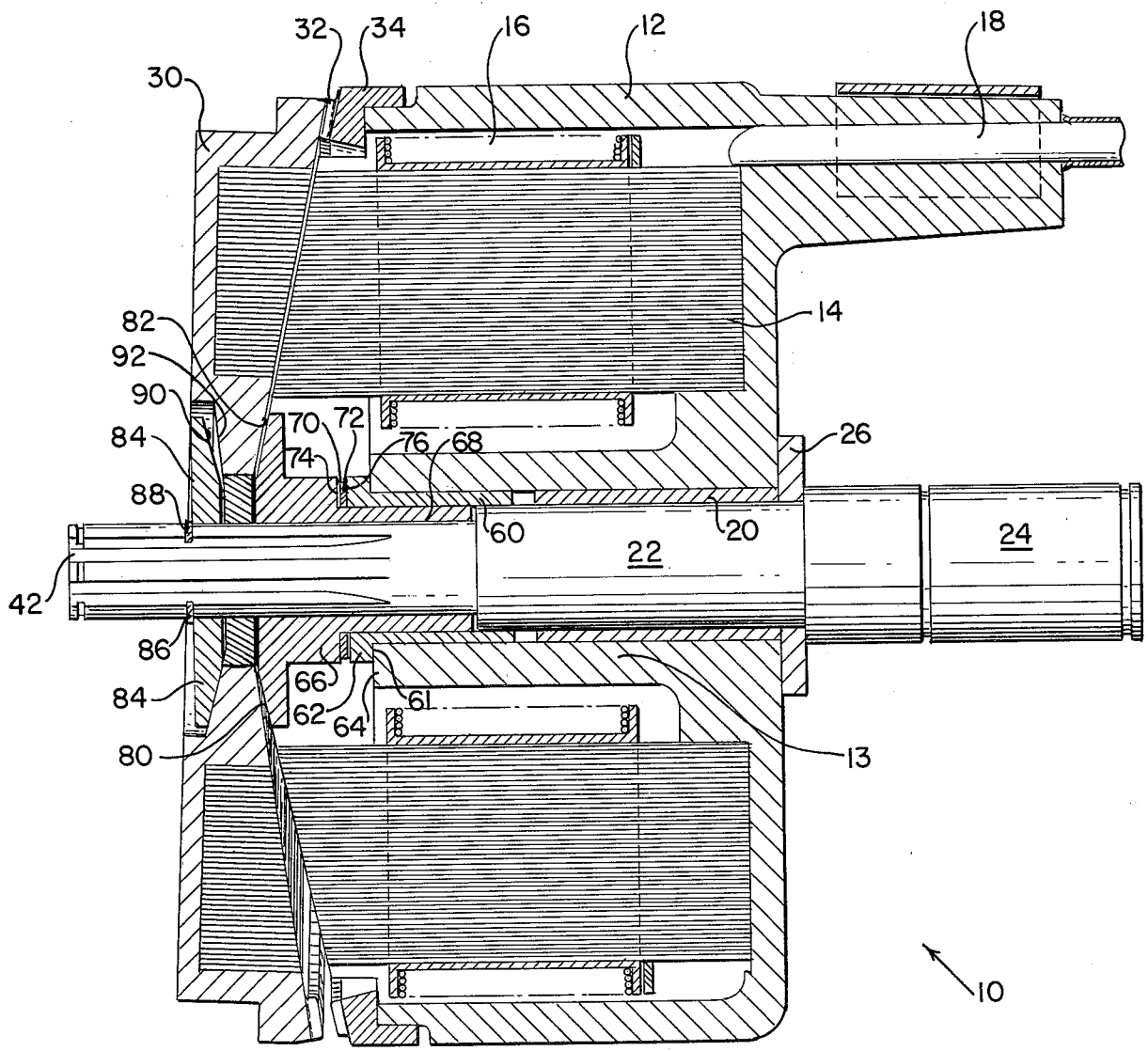
FIG. 1 is a cross-sectional assembled view of a nutating motor having a coupling according to the invention.

FIG. 1 shows a nutating motor assembly 10. A cup-shaped stator housing 12 includes a hollow cylindrical center portion 13. A plurality of laminated stator cores 14 are positioned within the housing and are sequentially energized by excitation of stator coils 16 (partially shown). The hollow cylindrical center portion of the housing 12 contains a sleeve bearing 20 and a stepped-down mid-section 22 of a motor output shaft 24 is journaled in the sleeve bearing 20. A thrust ring 26 is engaged by the step in the shaft 24. A nutating rotor 30 has a disk configuration. Gear teeth are positioned inside the outer edge of the nutating rotor 30 to form a ring gear 32 having a given number of teeth. A corresponding stator ring gear 34 having a different number of teeth is positioned on the stator housing 12 opposite the ring gear 32. Energization of certain stator coils 16 causes a certain sector of the ring gear 32 to engage the adjacent sector of the ring gear 34. As the stator coils are sequentially energized, the engagement point of the gears rotates in a circle around the motor so that the rotor has a wobbling motion. Because the ring gears 32, 34 do not have the same number of gear teeth, for one cycle of energization of the stator coils, the rotor 30 rotationally advances an angular increment determined by the ratio of the number of gear teeth on the rotor ring gear 32 to the stator ring gear 34.

Figure 2:
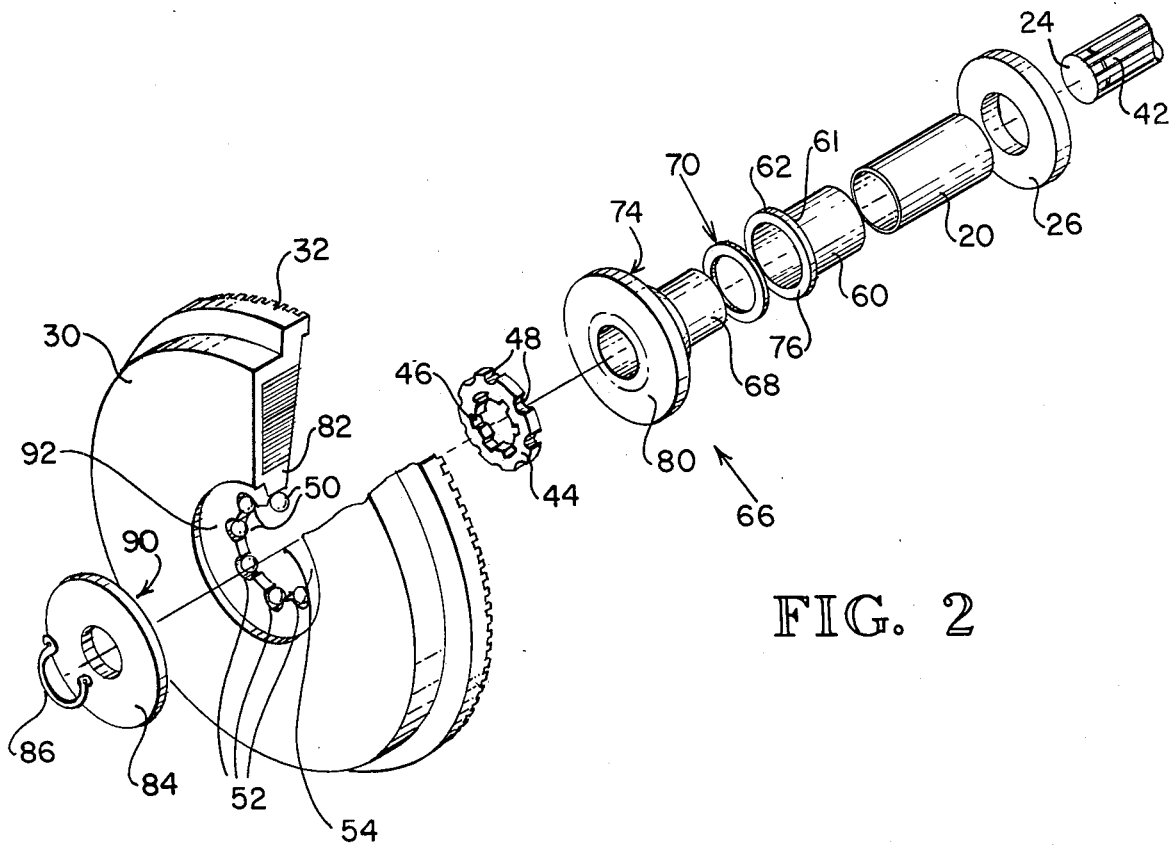
FIG. 2 is an exploded perspective view of the elements of a coupling and of motor shaft bearings.

Referring to FIG. 2, the coupling components are shown which transform the nutating motion of the rotor 30 to rotary motion of the output shaft 24. The bearing components are also shown which mount the output shaft 24 to the stator housing 12 for rotation about the output shaft axis.

Figure 3:
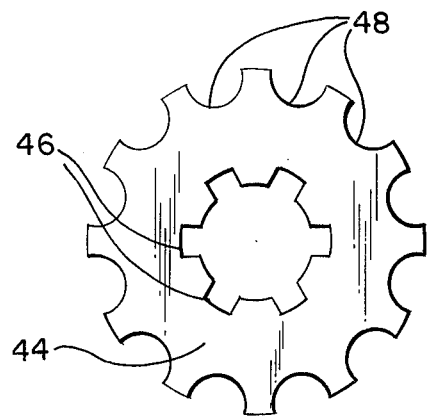
FIG. 3 is a side view of a ball guide and retainer.

FIG. 3 shows a ball guiding and retaining member 44 which is formed as a circular plate. The member 44 has internal grooves 46 formed adjacent to a central aperture, which grooves engage with splines 42 formed at the end of the output shaft 24. A plurality of slots 48 with a semi-circular cross-section are formed in the periphery of the ball guide member 44 and extend in a direction parallel to the axis of the shaft 24. Each of the slots serves as part of a ball retaining means for one of a plurality of steel balls 50. Each ball is partially contained in the slots 48 and part of each ball projects beyond the outer edge of the member 44. The nutating rotor 30 has slots 52 with a semi-circular cross-section formed in its central area adjacent a central aperture 54. The central area is, for example, a separate piece welded to the main body of the rotor. The slots 52 extend parallel to the axis of the rotor 30. Each of the slots 52 partially receives one of the balls 50 and the balls provide coupling between the rotor member 30 and the coupling member 44. The ball and shaft arrangement permits the axis of the rotor to tilt with respect to the axis of the output shaft 24. As the rotor member 30 tilts with respect to the axis of the shaft 24, the balls move within the elongated, semi-circular slots so that the rotary component of the motion of the nutating plate 30 is transmitted to the output shaft 24. In applications requiring larger angles of tilt, more than one ball is inserted within each slot 52. Other components which assist in delivering the rotational torque developed by the nutating motor to the output shaft are described below.

A second cylindrical sleeve bearing 60 is contained within the hollow cylindrical center portion 13 of the housing 12. The bearing 60 has a flanged end 62. The inside surface 61 of the flange 62 abuts the end 64 (FIG. 1) of the hollow cylindrical center portion 13 (FIG. 1). A thrust spacer 66 having a sleeved end 68 fits within the sleeve bearing 60 and engages the splines on the end of the shaft. A thin shim ring 70 and a compressible wave spring washer 72 are held between a radially extending face 74 of the thrust spacer 66 and an outside face 76 of the bearing flange 62. The spring washer 72 provides an axially directed biasing force between the housing and the thrust spacer 66. The outer part of the face end of the thrust spacer 66 has a beveled surface 80. A corresponding inwardly slanted surface 82 is formed on the rotor 30. As the rotor 30 nutates about the axis of the shaft 24, sectors of the surfaces 80, 82 come into contact and the thrust spacer 66 provides support for the rotor 30 near its center.

A second thrust spacer 84 has a central aperture with the wall of the aperture having grooves which also engage the splines 42 on the end of the output shaft 24. The second thrust spacer 84 is held onto the shaft 24 by means of a lock ring 86 which engages a circumferential slot 88 on the shaft 24. The interior face of the second thrust spacer 84 also has a beveled surface 90 near the outside margin. The rotor 30 has a corresponding inwardly slanted surface 92 similar to surface 80 on the first thrust spacer 66. As the rotor 30 nutates about the axis of the shaft 24, various sections of the surfaces 90, 92 roll into contact to also provide support for the rotor 30. The areas of contact between both thrust spacers 66, 84 and the rotor follow circular paths as the rotor 30 nutates and both thrust spacers provide support to the central area of the rotor 30.

The thrust spacers face areas which are near the shaft and which face the coupling member 44, lie in planes perpendicular to the axis of the shaft. The face areas are positioned adjacent the ball guiding and retaining member 44 and prevent the coupling balls 50 from falling out of the slots 48, 52.

The balls 50 are sized sufficiently large with respect to the slots 48 in the ball guide 44 and the slots 52 in the rotor 30 so that the rotary motion component of the nutating rotor 30 is coupled through the balls 50 to the shaft 24. This coupling provides a constant velocity output to the shaft 24.

While a particular embodiment of the invention has been shown and described, it should be understood that the invention is not limited thereto since many modifications may be made. It is therefore contemplated to cover by the present application any and all such modifications which fall within the true spirit and scope of the basic underlying principles disclosed and claimed herein.

I claim:

1. Apparatus for coupling a nutating rotor to a shaft of a motor, comprising:
   a plurality of balls;
   ball guiding and retaining means fixed to said shaft, said guiding and retaining means having a plurality of elongated slots with a semicircular cross-section formed at the radial periphery thereof, said slots each partially receiving one of said plurality of balls so that a portion of each of said balls projects beyond said guiding and retaining means;
   the nutating rotor having a central aperture formed therein and having a plurality of circumferentially spaced, elongated slots, each with a semicircular cross-section formed internally adjacent to said central aperture, said slots partially receiving said plurality of balls which project beyond said guiding and retaining means so that the balls provide coupling of the shaft to the nutating rotor, further including a radially extending inner thrust spacer mounted on said shaft adjacent to said guiding and retaining means, said thrust spacer having a surface for rolling engagement with the nutating rotor for supporting the rotor against inward axial movement and for retaining the balls in said slots, further including an outer thrust spacer mounted on said shaft adjacent the guiding and retaining means opposite the inner thrust spacer with respect to said guiding and retaining means, said outer thrust spacer supporting the rotor against axial outward movement and retaining the balls in said slots.

2. The apparatus of claim 1, wherein the slots formed in the nutating rotor extend in a direction substantially parallel to the axis of said shaft.

3. The apparatus of claim 1, including splines for fixing the guiding and retaining means to said shaft.

4. The apparatus of claim 1 wherein said inner thrust spacer surface includes a beveled, radially outer portion on the outer margin of the thrust spacer.

5. The apparatus of claim 1 wherein the nutating rotor includes a disc having gear teeth formed near the periphery thereof for engagement with gear teeth on a confronting surface of a fixed portion of the motor.

6. The apparatus of claim 1, including means biasing said inner thrust spacer axially outward against said rotor.

* * * * *